United States Patent
Wang

(10) Patent No.: US 10,625,435 B2
(45) Date of Patent: Apr. 21, 2020

(54) ELECTRONIC PIPE AND TUBE CUTTING SYSTEM

(71) Applicant: James Wang, Cary, IL (US)

(72) Inventor: James Wang, Cary, IL (US)

( * ) Notice: Subject to any disclaimer, the term of this patent is extended or adjusted under 35 U.S.C. 154(b) by 139 days.

(21) Appl. No.: 15/917,552

(22) Filed: Mar. 9, 2018

(65) Prior Publication Data

US 2019/0275691 A1    Sep. 12, 2019

(51) Int. Cl.
*B26D 3/16* (2006.01)

(52) U.S. Cl.
CPC .................... *B26D 3/169* (2013.01)

(58) Field of Classification Search
CPC ....................................... B26D 3/169
USPC ............................... 30/500, 92–97
See application file for complete search history.

(56) References Cited

U.S. PATENT DOCUMENTS

| | | | |
|---|---|---|---|
| 3,253,336 A | 5/1966 | Brown | |
| 3,449,992 A | 6/1969 | Hanaway | |
| 4,493,150 A | 1/1985 | Garcia et al. | |
| 4,682,919 A | 7/1987 | Mitcheli | |
| 4,769,911 A * | 9/1988 | Araki | B23D 21/04 30/94 |
| 4,802,278 A * | 2/1989 | Vanderpol | B23D 21/08 30/101 |
| 4,890,385 A * | 1/1990 | VanderPol | B23D 21/04 30/101 |
| 5,836,079 A * | 11/1998 | Cronin | B23D 21/08 30/101 |
| 6,065,212 A * | 5/2000 | Lazarevic | B23D 21/04 30/101 |
| 6,095,021 A * | 8/2000 | Epperson | B23D 21/04 82/113 |
| 7,013,567 B2 | 3/2006 | Myers | |
| 7,845,080 B2 * | 12/2010 | Nasiell | B23D 21/04 30/101 |
| 2005/0081388 A1 * | 4/2005 | Konen | B23D 29/002 30/228 |
| 2019/0275691 A1 * | 9/2019 | Wang | B26D 3/169 |

* cited by examiner

*Primary Examiner* — Hwei-Siu C Payer
(74) *Attorney, Agent, or Firm* — Knubox

(57) ABSTRACT

An electronic pipe cutting system and methods of use are described herein. A drive cutting assembly contains one or more cutting wheels that rotate around a pipe. A drill is used to connect to a main shaft and one or more gears transfer and transform the energy of the drill into optimal motion of the cutting wheels. The present invention provides a low cost, compact and lightweight pipe cutting system in comparison to other electronic pipe cutting system.

19 Claims, 18 Drawing Sheets

ELECTRONIC PIPE AND TUBE CUTTING SYSTEM

CROSS REFERENCE TO RELATED APPLICATION

Not related to this application.

STATEMENT REGARDING FEDERALLY SPONSORED R&D

Not related to this application.

TECHNICAL FIELD

This invention relates to pipe and tube cutting systems, and more particularly to electronically driven pipe cutters that utilize metallic cutter wheels to rotate around a pipe or tube.

BACKGROUND OF THE INVENTION

Pipe cutters are well known in the art of plumbing and other industries that utilize pipe and tubing. Pipe cutters provide a cleaner and more convenient way to make cuts than saws. There are two main types of common pipe cutters. A first variety is shearing, wherein a sharp blade applies a direct force to a pipe. The force may be applied via a mechanical advantage, such as ratchet or lever. Ratcheting pipe cutters are common and although useful for cutting plastic, they generally do not work on metallic tubes and pipes.

The other variety of pipe cutter is the adjustable cutter wheel that utilizes one or more hardened metallic wheels that rotate around the circumference of a tube or pipe. A force applied to the wheels in the direction of the tube create deformation of the pipe material. After one or more rotations, the cutting wheel displaces enough pipe material to separate the pipe into two pieces. Typically, rotation of the pipe cutter around the pipe is accomplished by the user and a screw applies the force to the cutting wheel against the pipe. Although useful for a small number of cuts, many sequential cuts can be slow and tiring for the user. In the situation of daily professional use, prior art manual wheel type pipe cutters can cause repetitive motion injuries.

Electronic pipe cutters are available for professional use. They typically have an electric motor embedded in the pipe cutter. The electric motor causes rotation of the pipe, or cutting wheels, which makes them suitable for many repetitive cuts. The downside of electronic pipe cutters is that they are expensive. Wherein a homeowner may have a single project requiring many cuts, the cost of professional electronic pipe cutters makes them unpractical for such use.

In these respects, the present invention departs from conventional concepts of the prior art by providing a wheel type pipe cutter that is electronically driven by a typical drill. The present invention provides a lightweight and compact pipe cutter that is suitable for professional and non-professional use.

SUMMARY OF THE INVENTION

The present invention takes a very different approach to driving a wheel type pipe cutter in comparison to the prior art.

The present invention provides a pipe cutting system that is electronically driven. More particularly, the present invention provides a pipe cutting system that utilizes a common electric or air powered drill to drive the cutting action. A driven cutting assembly contains a plurality of cutting wheel assemblies that each contain a hardened metallic cutting wheel. The cutting wheel assemblies are connected to the driven cutting assembly via a pin. The cutting wheel assemblies can rotate to accommodate a wide range of pipes or tubes. A common electronic drill connects to the main drive shaft assembly. A mechanical advantage is created through a plurality of gears which slow the rotational speed of the drill. The rotational gears connect to the driven cutting assembly which rotates around the pipe, causing the pipe to be cut in the desired location. Other features are described to make the present invention particularity useful.

An object of the present invention is to create a low cost electronic pipe cutting system by utilizing a common drill to drive the system.

An object of the present invention is to create an electronically driven pipe cutting system that is adjustable for different diameters of pipe and tube.

An object of the present invention is to create an ergonomic pipe cutting system that reduces fatigue of the user.

An object of the present invention is to create a lightweight yet durable electronic pipe cutting system that limits potential damage from incorrect use.

These and other features, aspects, and advantages of the present invention will become better understood with regard to the following description, appended claims, and accompanying drawings.

BRIEF DESCRIPTION OF THE DRAWINGS

Preferred embodiments of the invention are described below with the reference to the following accompanying drawings:

FIG. 2 is from the same perspective as FIG. 1.

DETAILED DESCRIPTION OF THE PREFERRED EMBODIMENTS

Many of the fastening, connection, control, manufacturing and other means and components utilized in this invention are widely known and used in the field of the invention, and their exact nature or type is not necessary for a person of ordinary skill in the art or science to understand the invention; therefore they will not be discussed in detail. Furthermore, the various components shown or described herein for any specific application of this invention can be varied or altered and anticipated by this invention and the practice of a specific application or embodiment of any element may already be widely known or used in the art, or persons skilled in the art or science; therefore, each will not be discussed in significant detail.

The present invention utilizes gears and fastening methods that are common in the art of mechanical engineering and tool design. These features are described to a level common in the art which does not required undue experimentation for one skilled in the art to appreciate or practice the present invention.

Figure 1:
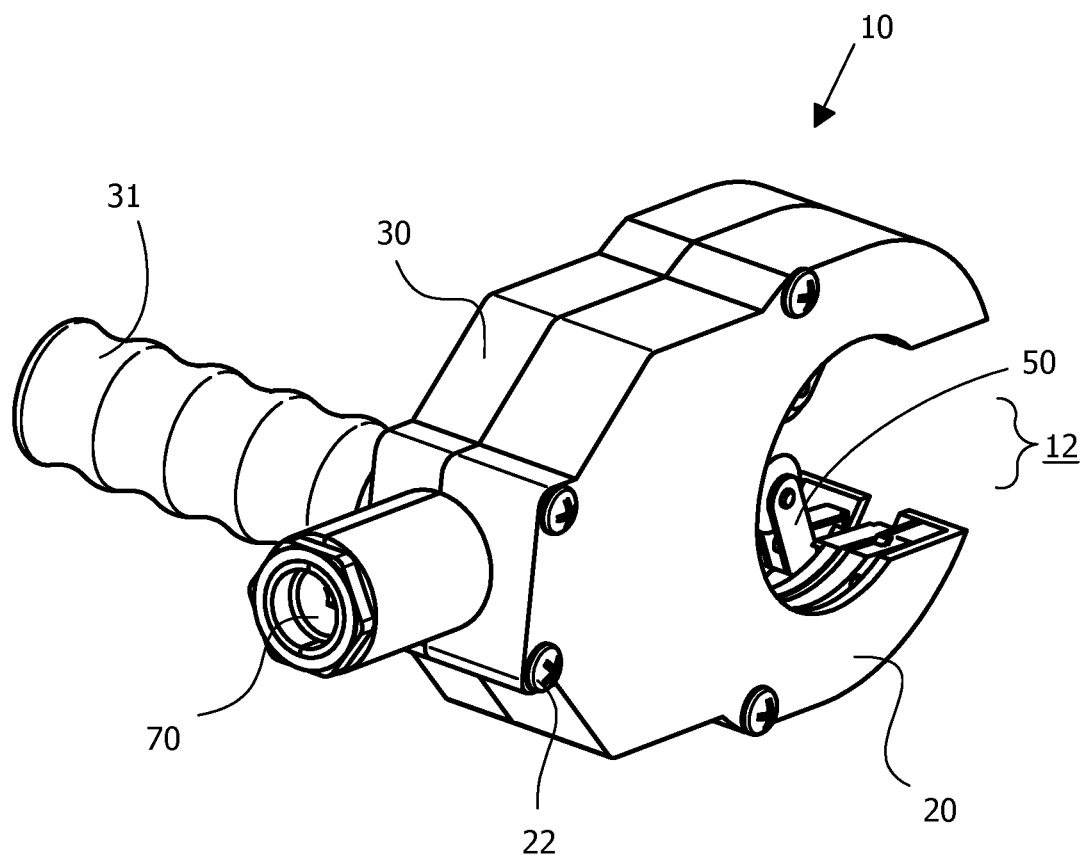
FIG. 1 is a rear perspective view of the electronic pipe cutting system of the present invention.
Figure 2:
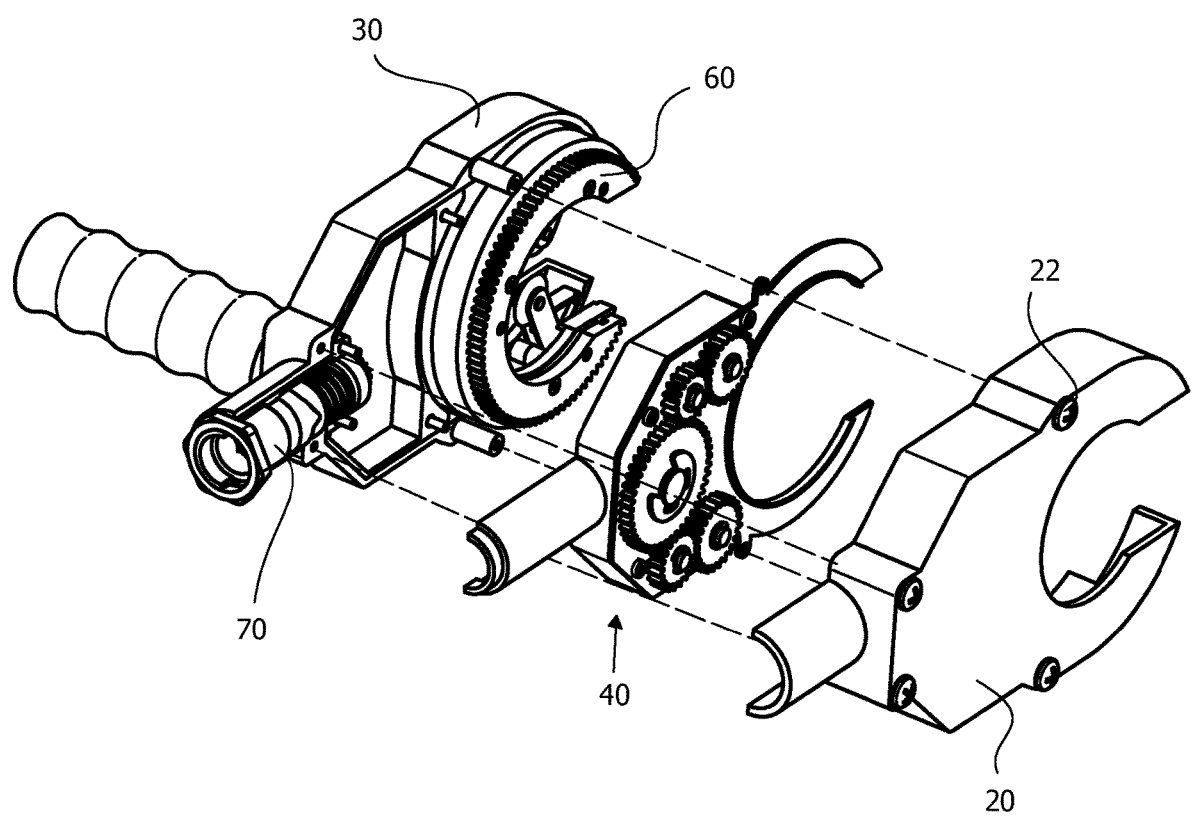
FIG. 2 is a partially disassembled view of the pipe cutting system of FIG. 1 showing the gear cover and gear assembly detached.
Figure 3:
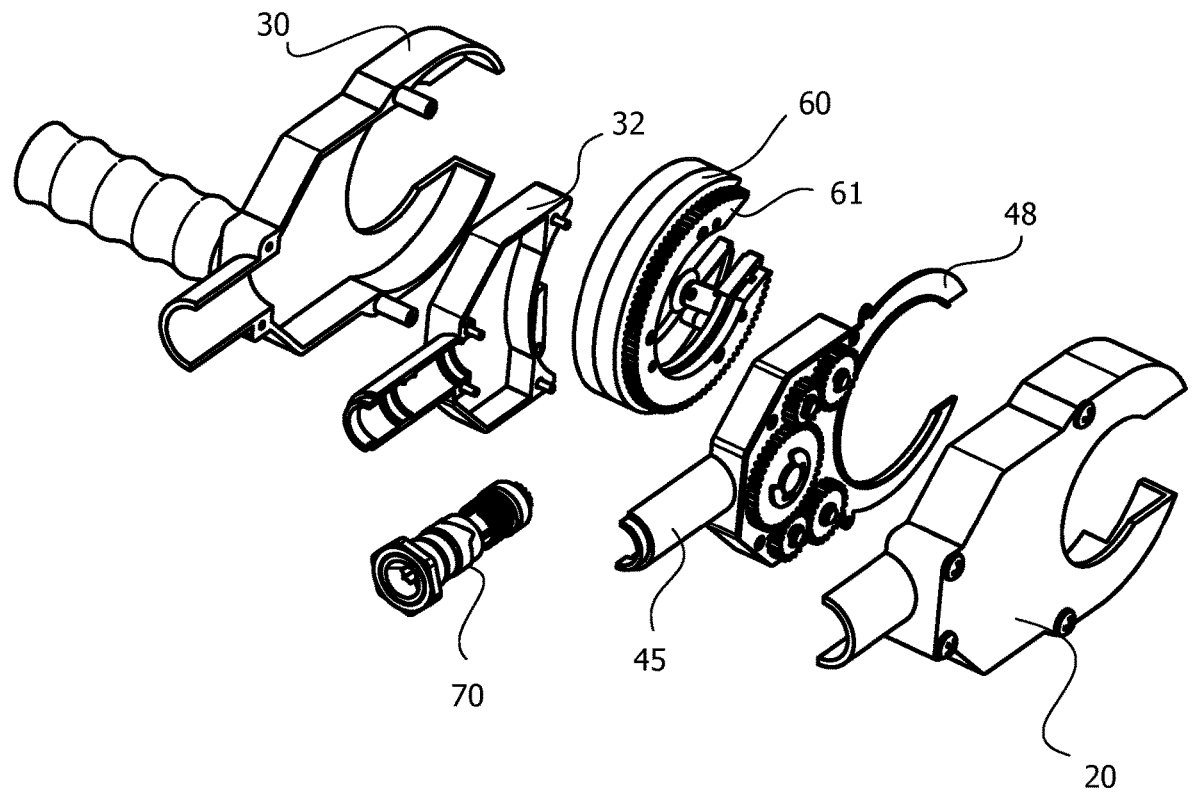
FIG. 3 is a further disassembled view of the pipe cutting system of FIG. 2 showing the main components of the present invention.
Figure 4:
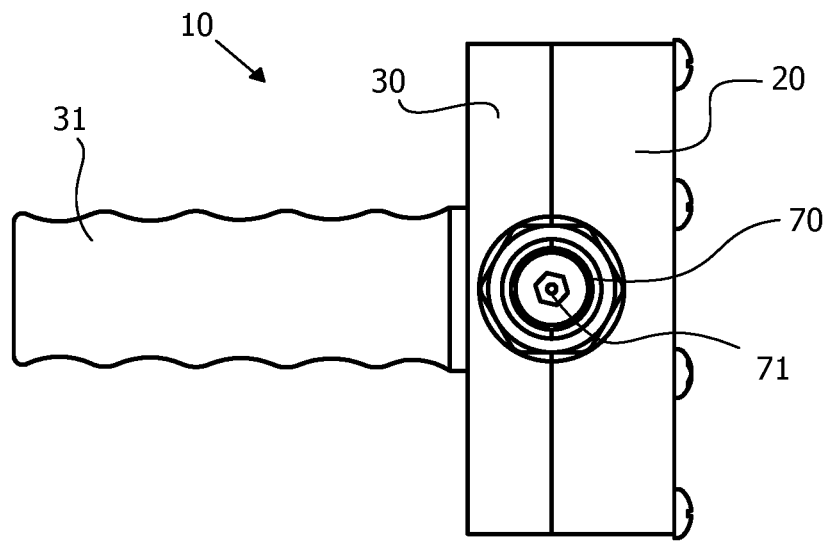
FIG. 4 is a rear view of the pipe cutting system and showing the drive shaft engagement feature.
Figure 5:
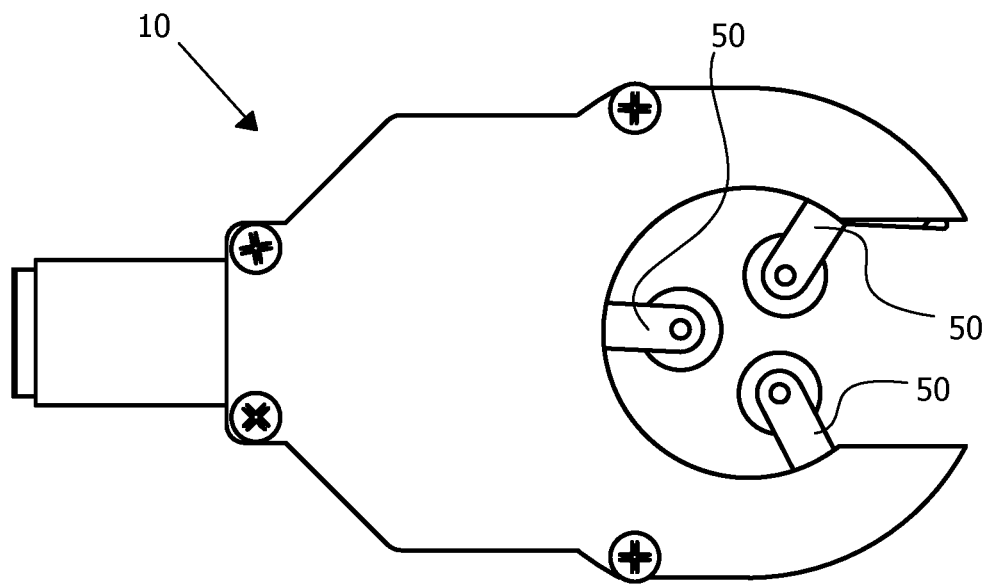
FIG. 5 is a right side view of the pipe cutting system of FIG. 1 and showing a plurality of cutting wheel assemblies in an extended position.

Pipe cutters are common in the art of tools and plumbing. The present invention is a "cutter wheel" style pipe cutter that may be used for cutting both plastic and metallic pipe or tubing. FIG. 1 shows an assembled pipe cutting system 10, according to the present invention. A gear cover 20 is connected to a handle cover 30 via a plurality of cover fasteners 22. Handle cover 30 includes a handle 31 which allows a user to control pipe cutting system 10 during use. Gear cover 20 and handle cover 30 may be constructed from plastic or metal. Both handle cover 20 and gear cover 30 are "C" shaped and form an opening 12 for a pipe 8 to enter a cutting position. Although cover fastener 22 is shown as a Philips style screw, it should be appreciated that it is not limited to such and that any mechanical connection between covers 20 and 30 may be used. Contained within assembled gear cover 20 and handle cover 30 is a drive shaft assembly 70, a gear assembly 40, and a driven cutting assembly 60.

Figure 19:
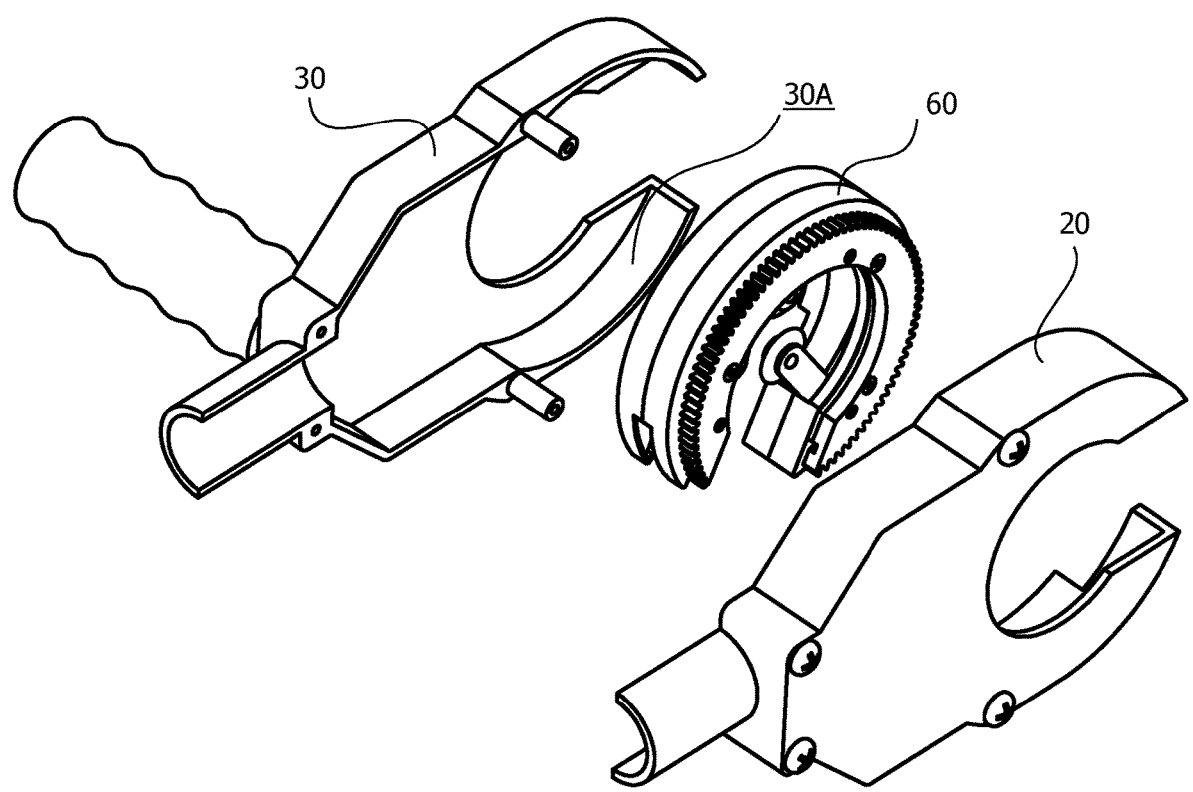
FIG. 19 is a rear right side perspective view of the present invention and showing how the driven cutting assembly is captured within the gear cover housing and the handle cover.
Figure 20:
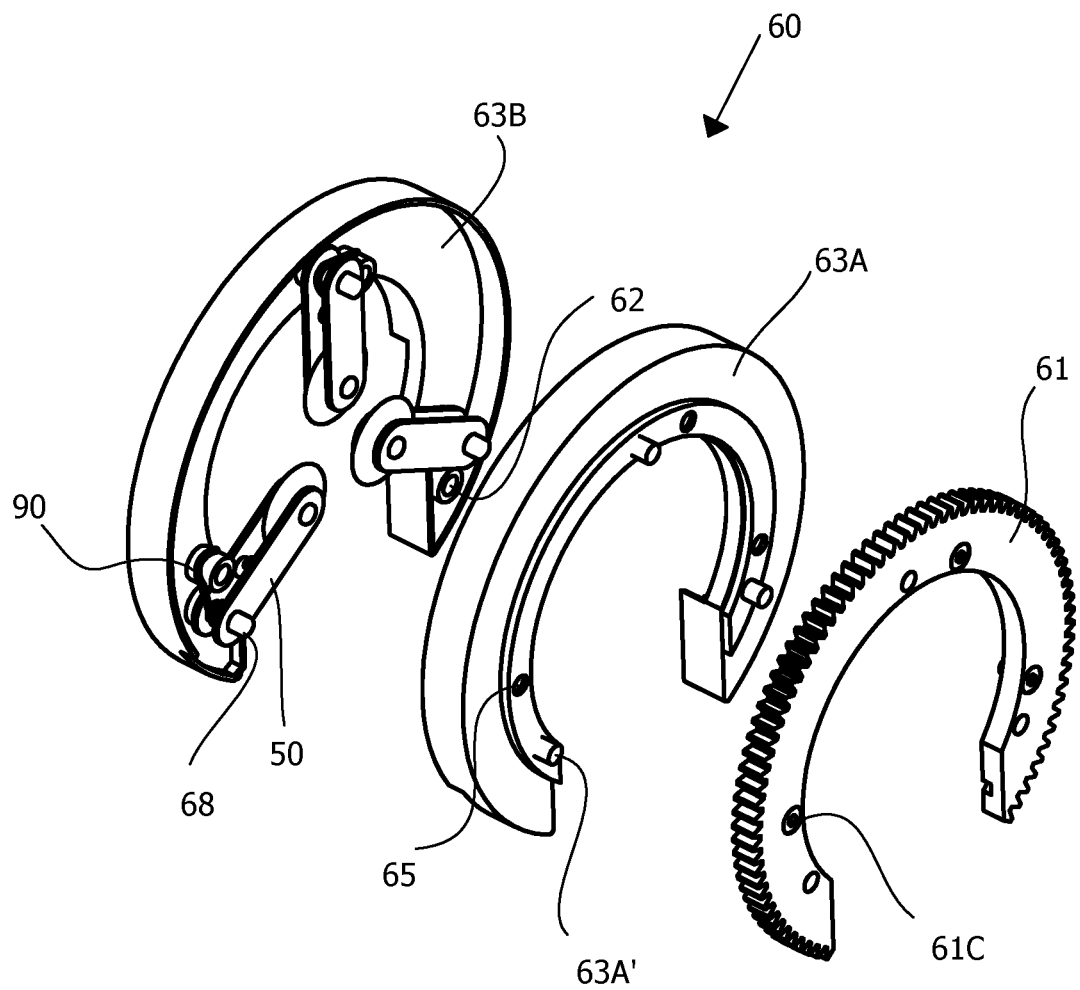
FIG. 20 is a right side perspective view of the driven cutting assembly disassembled into its main components.

Driven cutting assembly 60 is best seen in FIG. 19 and FIG. 20. Prior to inserting a pipe into cutting system 10, driven cutting assembly 60 is rotated with its opening aligned to opening 12. During the cutting process, driven cutting assembly 60 rotates with respect to covers 20 and 30 causing a plurality of cutter assemblies 50 to create mechanical deformation to pipe 8. As shown in FIG. 20, driven cutting assembly 60 is comprised of a driven cutting assembly cover 63B, a driven cutting assembly base 63A, and a driven gear ring 61. Driven gear ring 61 contains a plurality of gear teeth that engage with gear assembly 40 to cause driven cutting assembly 60 to rotate. Driven cutting assembly base 63A is secured to driven gear ring 61 by means of a plurality of a pin 63A' which extend into holes of driven gear ring 61. A plurality of driven gear ring fasteners 61C extend through a fastener hole 65 of driven cutting assembly base 63A and are secured to one or more of a spring boss 62. A pivot 68 is used to connect cutter assembly 50 and secures driven cutter assembly cover 63B to driven cutting assembly base 63A. Collectively, pivot 68, pin 63A' and driven gear ring fasteners 61C provide the means to make driven cutting assembly 60 act as a single rotatable unit.

Figure 15:
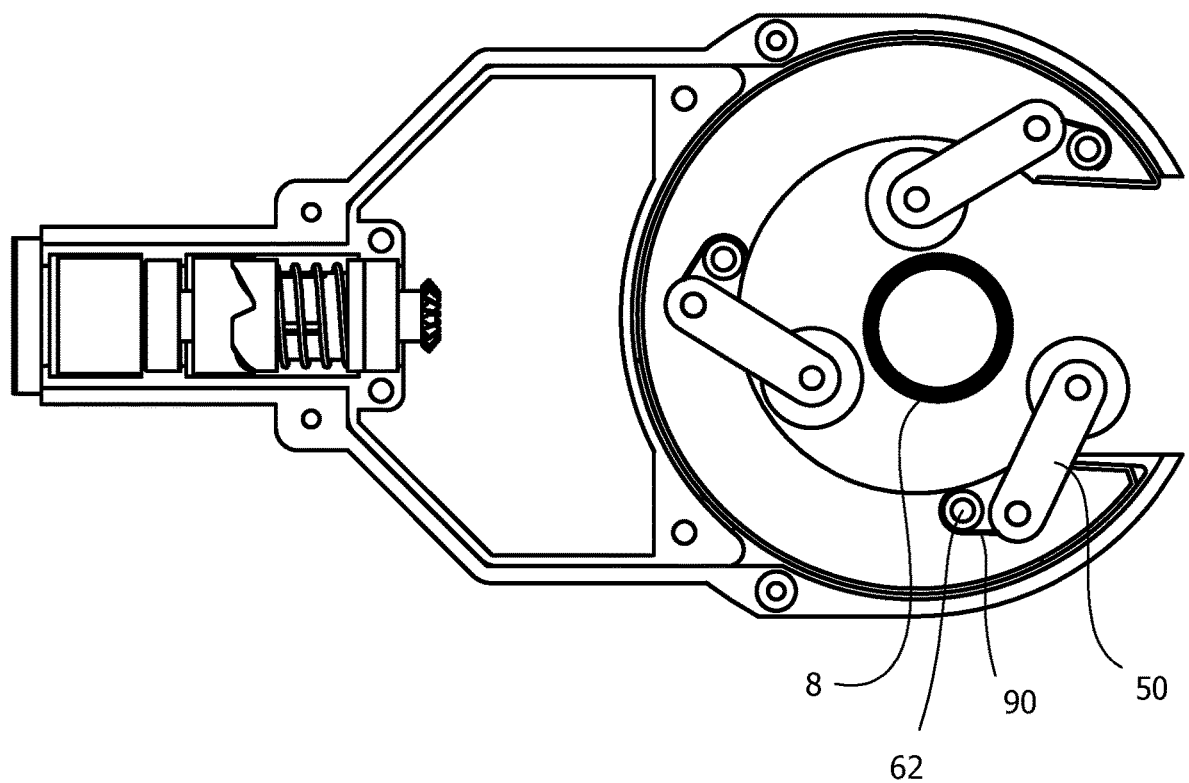
FIG. 15 is the right side view of FIG. 14 with the cutting wheel assemblies in the partially extended position. A pipe is being loaded into the cutting position.
Figure 16:
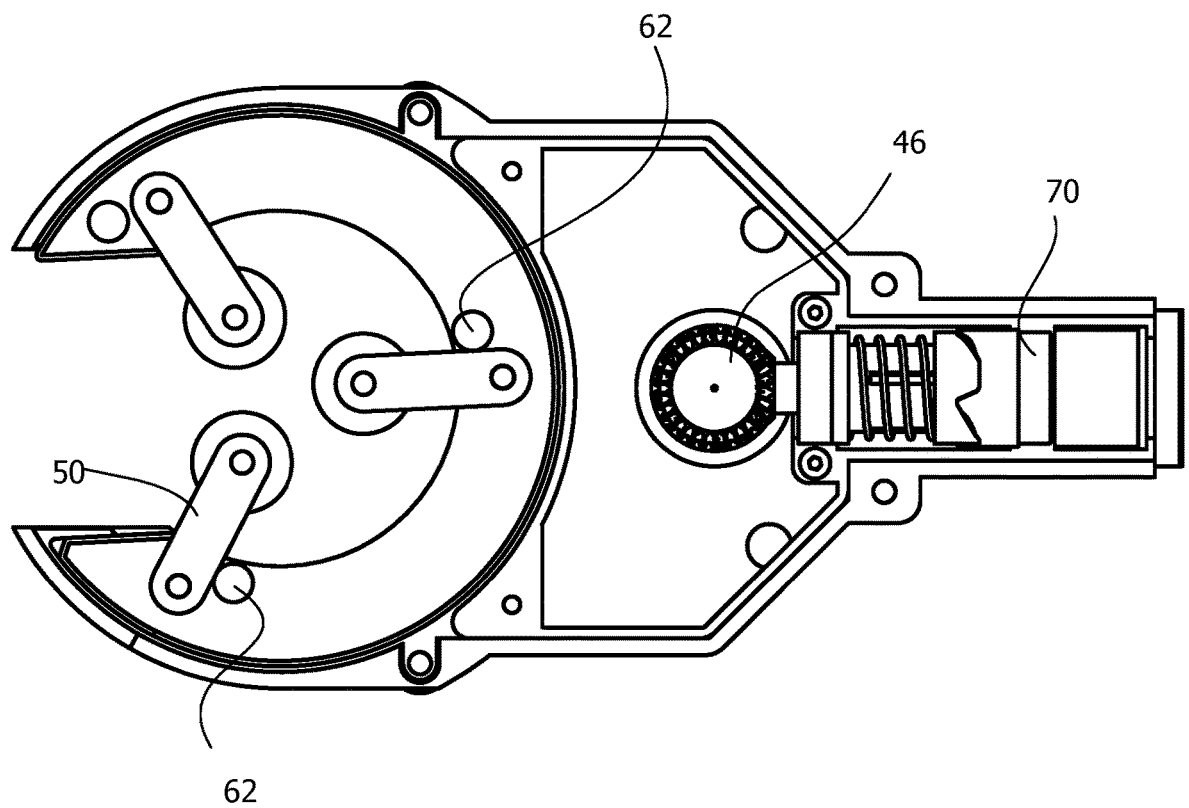
FIG. 16 is a left side view of the cutting system of FIG. 1 and showing cutter stops acting on the cutting wheel assemblies. The view has the handle cover removed to show the inner components.
Figure 21:
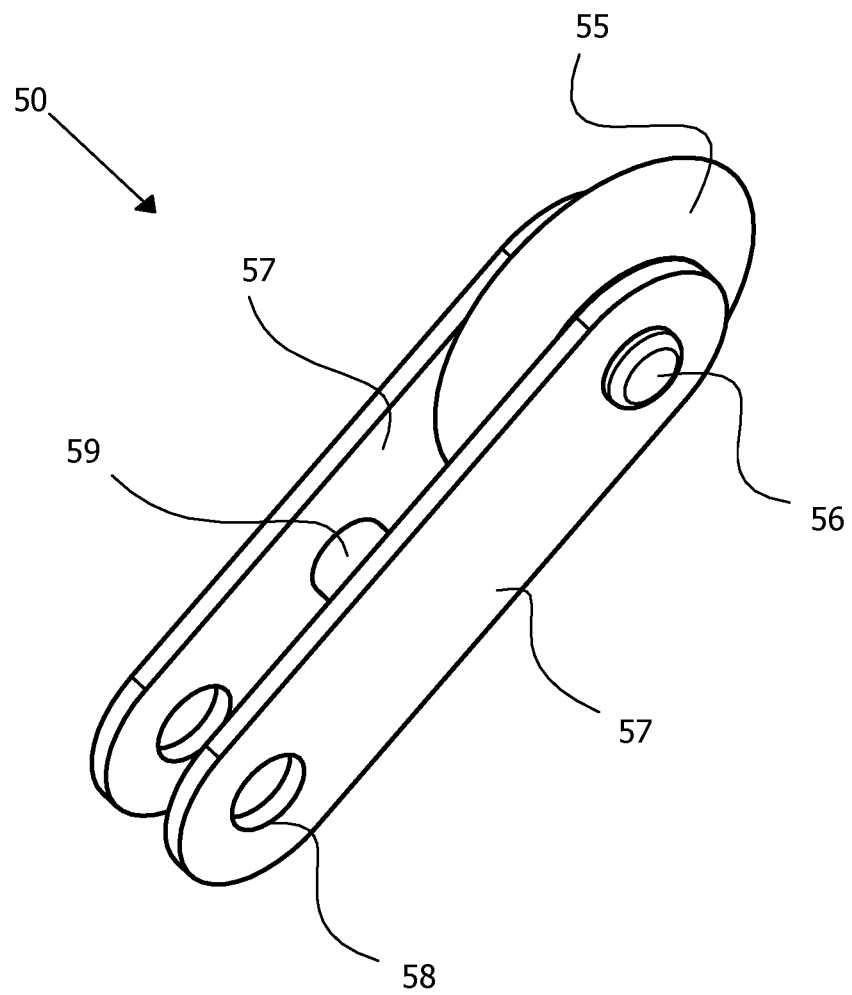
FIG. 21 is a perspective view of a cutting wheel assembly.

As shown in FIG. 20, cutter assembly 50 is secured to driven cutting assembly cover 63B by pivot 68 extending through a pivot hole 58 of a cutter arm 57. Although this description is for a single cutter assembly 50, it should be appreciated that any number greater than one of cutter assembly 50 may be used within the spirt and scope of the present invention. Preferred, and according to the best mode of the present invention, it has been found that three of cutter assembly 50 provides good cutting performance and balanced cutting rotation around pipe 8. As shown in FIG. 21, cutter assembly 50 has two of cutter arm 57 which transfer forces from a cutter wheel 55 back into driven cutting assembly 60. Cutter wheel 55 is a typical wheel style cutter made from hardened steel. Cutter wheel 55 is commercially available from a wide range of sources. Cutter wheel 55 is secured and rotates around a wheel pin 56. Thus, the pointed outside surface of cutter wheel 55 may rotate and apply a significant force to pipe 8, causing mechanical deformation and cutting of pipe 8. A separator 59 between the two cutter arms 57 provides alignment as well as a connection point for a cutter spring 90. As shown in FIG. 20, cutter spring 90 wraps around pivot 68 and through its connections to both separator 59 and an adjacent spring boss 62 causes cutter assembly 50 to move to its extended position. As shown in FIG. 15, pivot 68 and spring 90 allow cutter assembly 50 to deflect outward to a second position that allows the loading of pipe 8, as well as to allow cutter system 10 to work with a wide range of diameters of pipe 8. Spring 90 causes cutter assembly 50 to extend outward and to naturally make contact with pipe 8. Upon rotation of driven cutting assembly 60 in the direction of arrow 101 (FIG. 18) cutter wheel 55 applies a significant force against pipe 8. As shown in FIG. 16 and with the absence of pipe 8, cutter assembly 50 is stopped in the extended position by spring boss 62.

Figure 17:
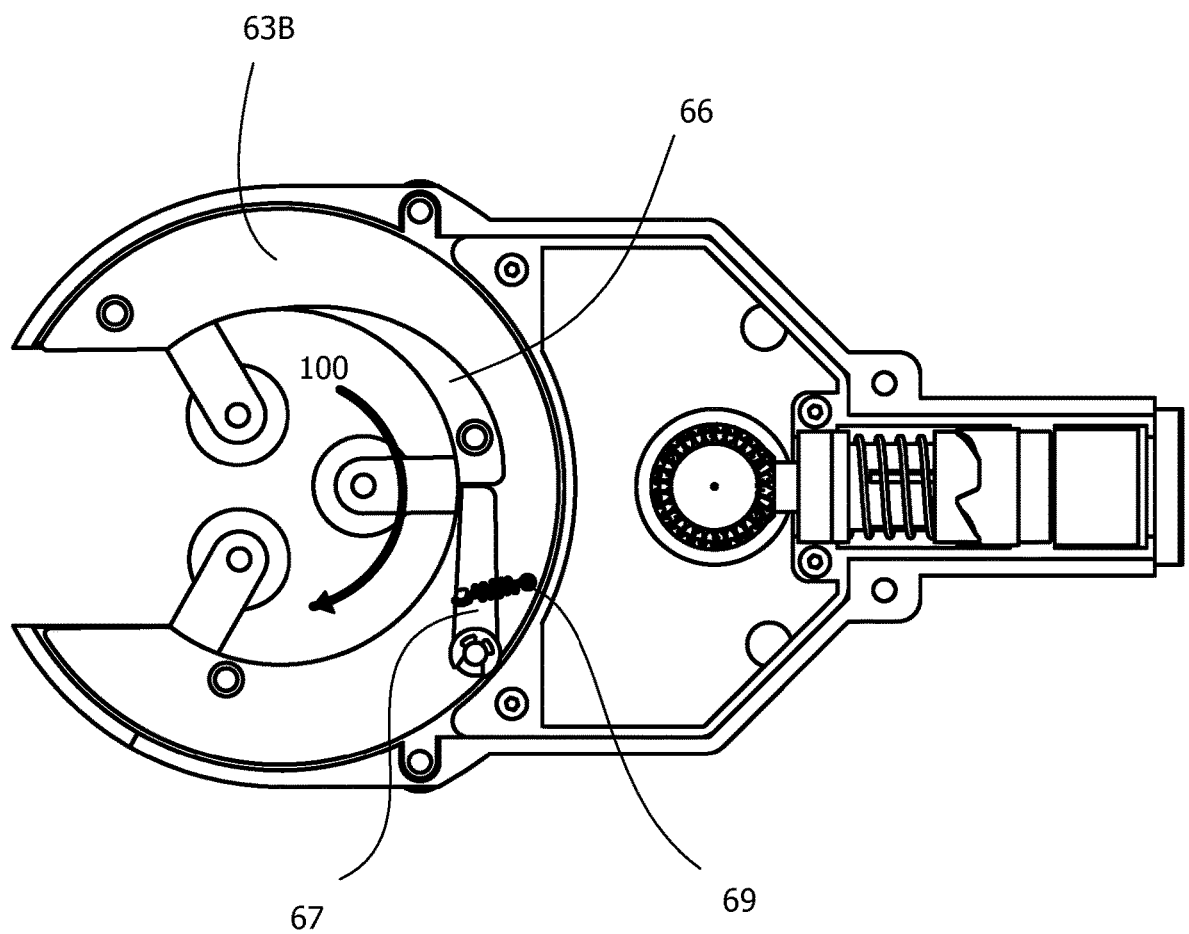
FIG. 17 is a left side view of the cutting system of FIG. 1 and showing the anti-rotation ridge engaged with the anti-rotation bar.
Figure 18:
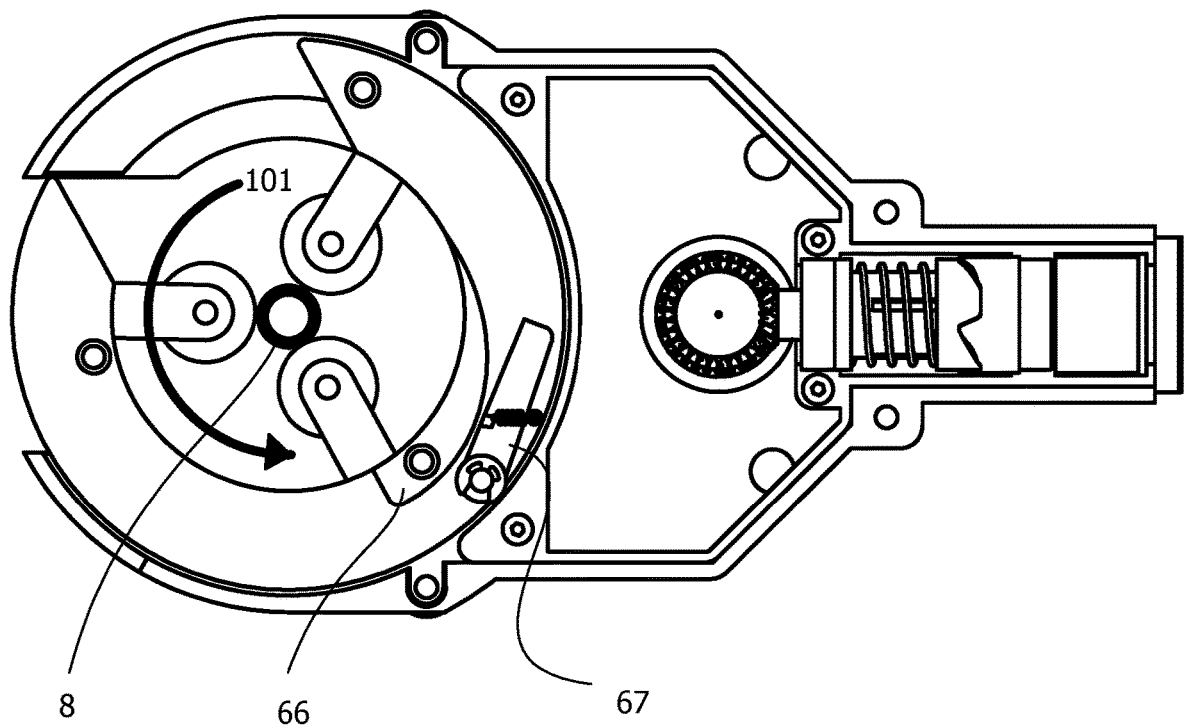
FIG. 18 is a left side view of the cutting system of FIG. 1 and showing the anti-rotation ridge deflecting the anti-rotation bar.

Due to the allowed rotation of cutter assembly 50, cutter system 10 flexibly accommodates a wide range of diameters of pipe 8, but driven cutting assembly 60 must rotate in the direction of arrow 101 to enable cutting. Rotation in the direction of arrow 100 of FIG. 17 does not result in cutting. As shown in FIG. 17, a rotation ridge 66 secured to the left side (exterior) of cutter assembly cover 63B forces driven cutting assembly 60 to only rotate in the cutting direction of arrow 101. As shown in FIG. 18, the rotation of driven cutting assembly 60 in the proper direction causes a rotation bar 67 to deflect and to not engage ridge 66. The growing profile of ridge 66 causes rotation bar 67 to move and to compress a rotation spring 69. Upon more rotation of driven cutting assembly 60, rotation spring 69 causes rotation bar 67 to move inward to a position shown in FIG. 17. In the event driven cutting assembly 60 rotates in the direction of arrow 100, rotation bar 67 engages rotation ridge 66 and stops further rotation of driven cutting assembly 60. Driven cutting assembly 60 rotates within a space formed by handle cover 30, a handle inside cover 32, a gear inside cover 45 and gear cover 20.

Figure 8:
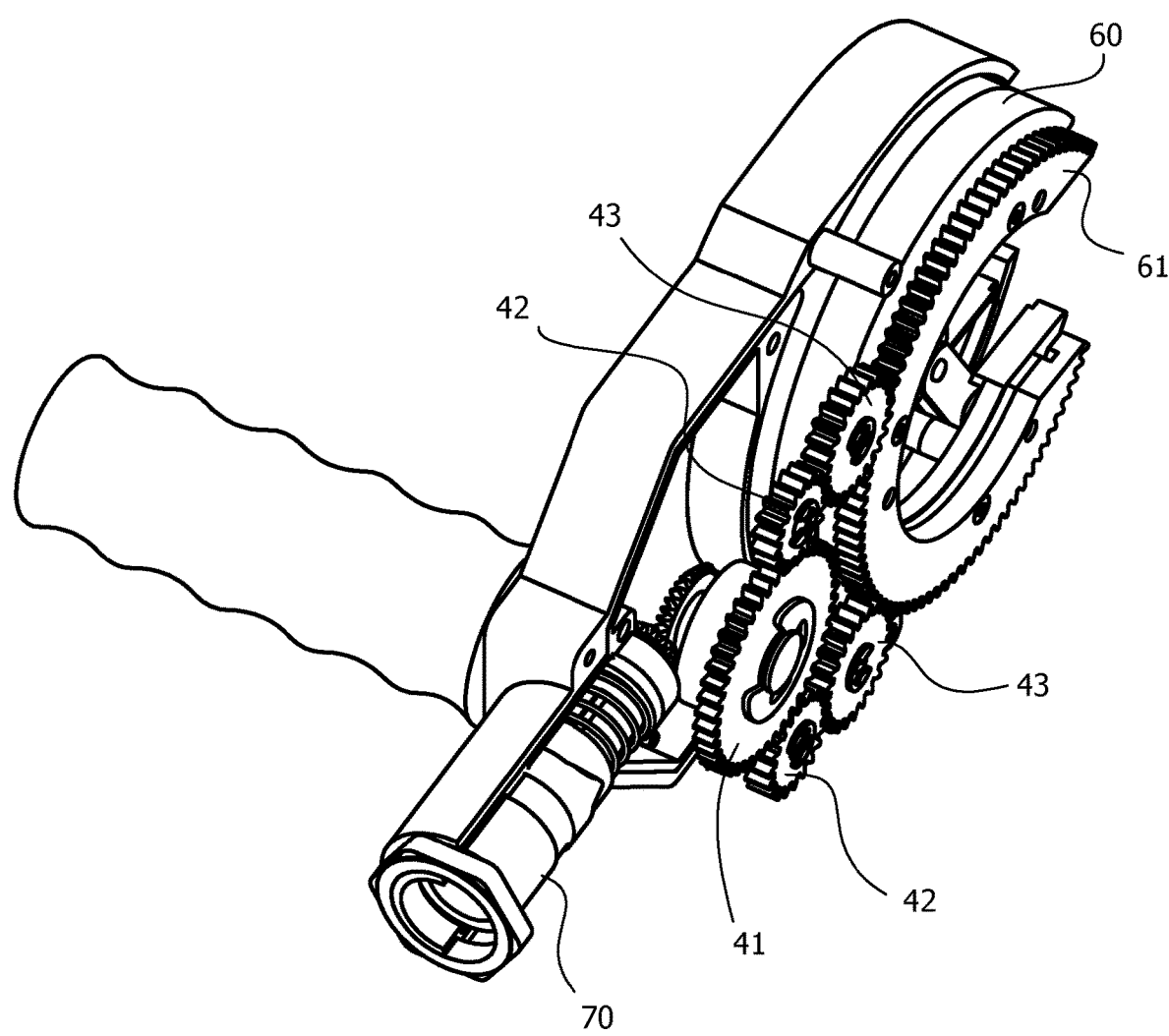
FIG. 8 is a rear perspective view of the pipe cutting system of FIG. 1 and with the gear side cover and gear cover removed to show the gear system and main drive shaft assembly.

Gear assembly 40 contains a plurality of gears which ultimately transforms the input energy of a drill 5 into optimal cutting speeds of wheel 55. A secondary gear shaft 46 includes a bevel gear on its inward surface and a secondary bearing 47 is secured to gear inside cover 45. Secondary gear shaft 46 extends through gear inside cover 45 and to a primary drive gear 41. Primary drive gear 41 and secondary gear shaft 46 may be manufactured as one piece, or attached using common groove-clip connection methods as shown in FIG. 8. Although any number and sizes of spur and bevel gears may be used within the spirt and scope of the present invention, FIG. 8 shows the best mode with primary drive gear 41 in connection with two of a secondary gear 42. Secondary gear 42 is in mechanical connection with an intermediate gear 43. Intermediate gear 43 is in mechanical connection with driven gear ring 61. Wherein gear inside cover 45 is preferably made from plastic, an inside gear plate 48 made from thin sheet metal provides a secure and durable surface to mount gears 41, 42 and 43. As shown, shafts having a groove in combination with snap rings provide a low cost assembly method. Other common shaft and gear connection methods may be used within the sprit and scope of the present invention. According to the best mode of the present invention, primary drive gear 41 is approximately 42 mm in diameter, secondary gear 42 is 20 mm in diameter, and intermediate gear 43 is approximately 26 mm in diameter. With driven cutting assembly 60 having a diameter of approximately 100 mm and suitable for diameters of pipe 8 having a range of 12 mm to 50 mm, a gear reduction of 3.8 has been found to provide good cutting performance. Wherein a drill 5 may have a rotational speed of 600 revolutions per minute, a reduction of 3.8 translates to driven cutting assembly 60 having a rotational speed of approximately 150 revolutions per minute. The size and gear reduction values may be optimally chosen for a particular size range and materials of pipe 8.

Figure 9:
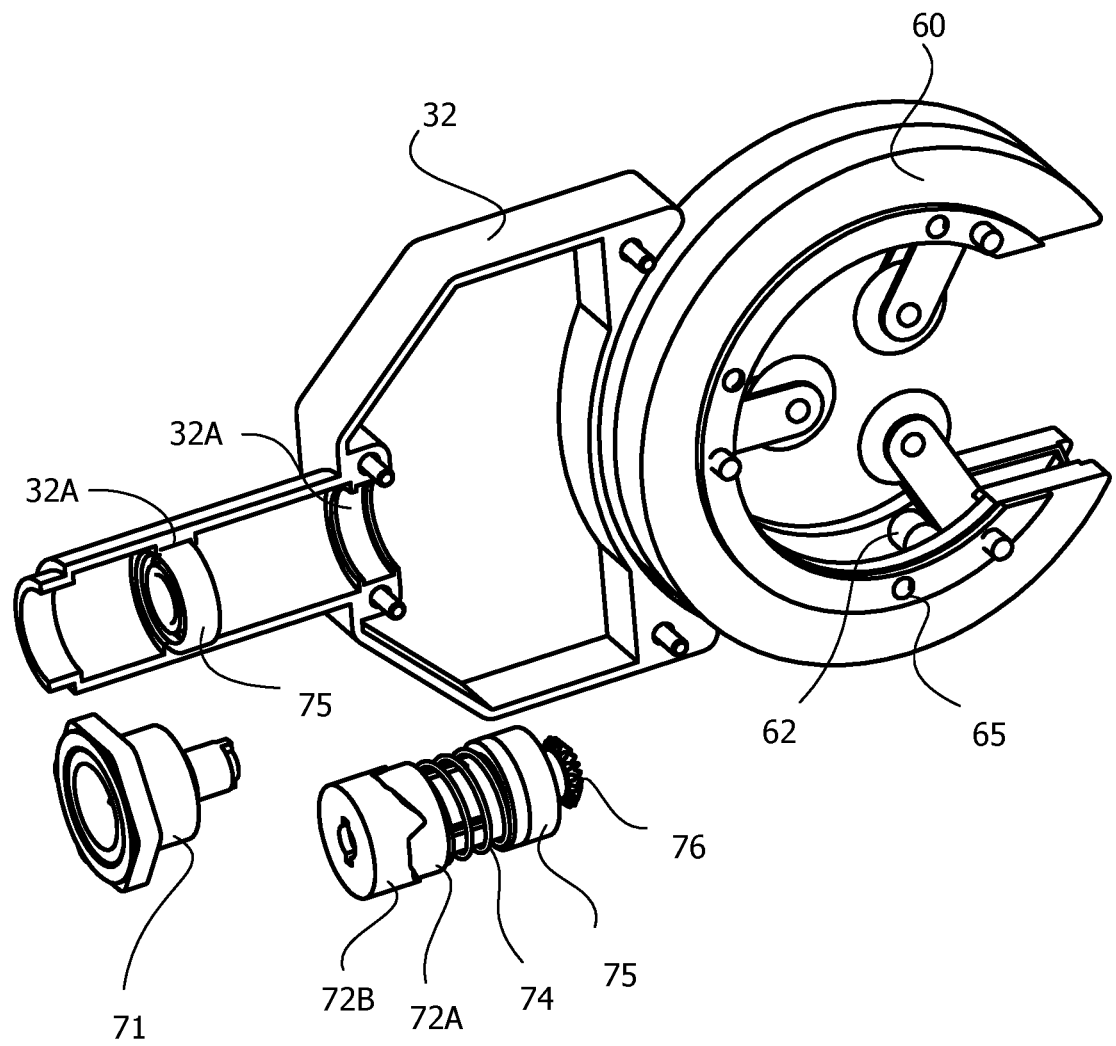
FIG. 9 is a right perspective view of the pipe cutting system and showing the components of the main drive shaft. The driven gear ring is removed to show how it attaches to the driven cutter assembly.

As shown in FIG. 8 and FIG. 9, secondary drive shaft 46 is in mechanical connection with a drive shaft gear 76 of drive shaft 70. The bevel gear interface between drive shaft 76 and secondary drive shaft 46 provides the means of changing the direction of force from drill 5 and providing space to connect gears 41, 42, 43 and driven gear ring 61. Drive shaft gear 76 is comprised of a drive shaft bearing 75, a drive shaft spring 74, and an over-torque collar 72. Drive shaft gear 76 is also rotationally constrained, but linearly slideable, to an outer shaft 71. Outer shaft 71 is connected to an over-torque collar 72B and a second shaft bearing 75. Drive shaft 70 is constrained by both gear inside cover 45 and handle inside cover 32. Bearing 75 fits into a pocket 32A of handle inside cover 32, and bearing 75 of drive shaft gear 76 fits into a second pocket 32A. Corresponding pockets exist in gear inside cover 45 so that when covers 45 and 32 are connected they constrain drive shaft 70.

Figure 10:
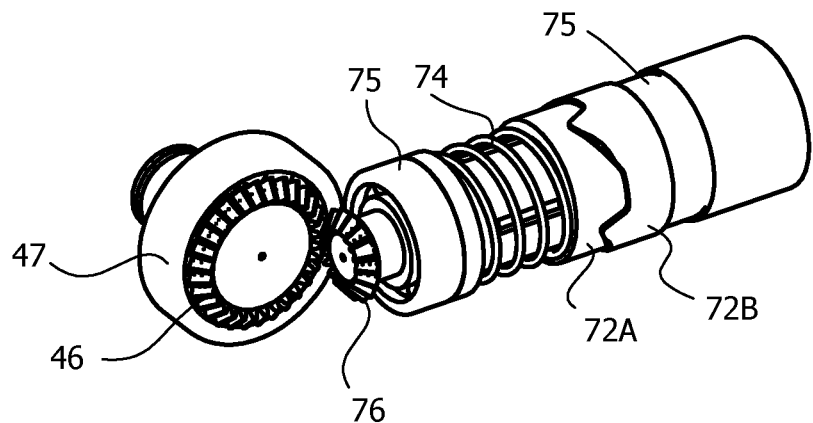
FIG. 10 is a front perspective view of the main shaft bevel gear in connection with the secondary bevel gear shaft. The over-torque collar is in the engaged position.
Figure 11:
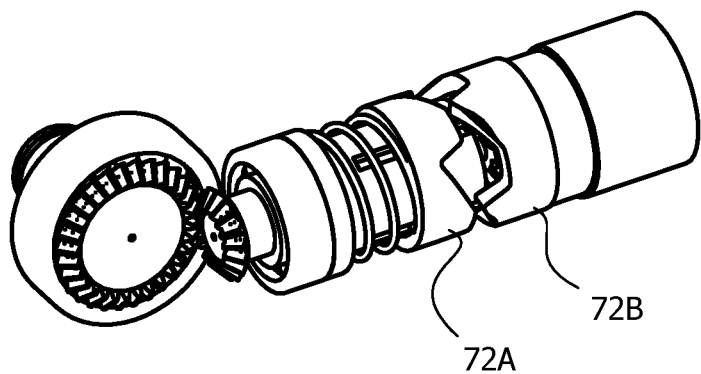
FIG. 11 is the same view as FIG. 10, but with the over-torque collar in the disengaged position.
Figure 12:
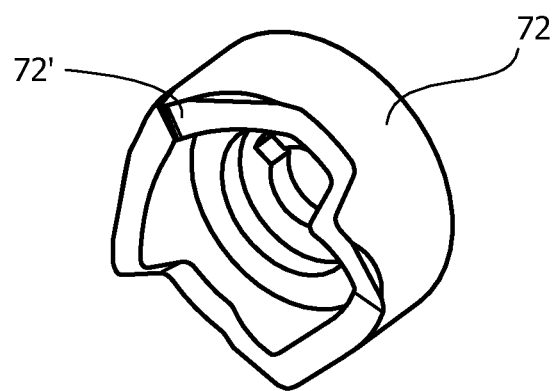
FIG. 12 is perspective view of the over-torque collar of FIG. 10 and FIG. 11.
Figure 13:
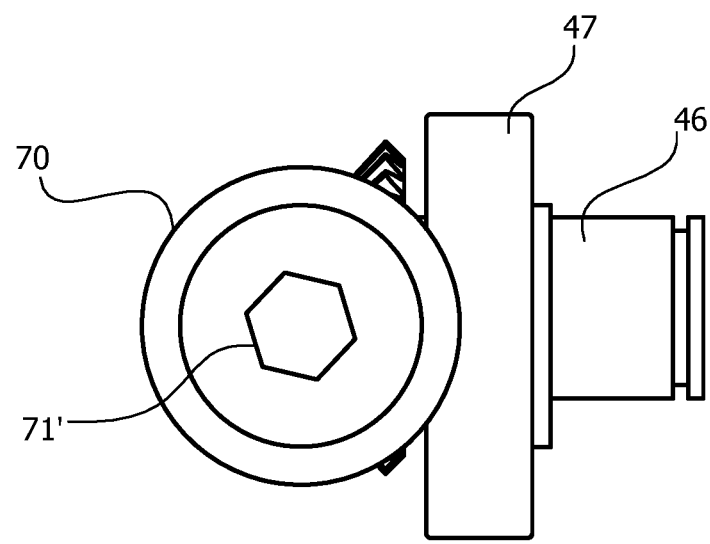
FIG. 13 is a rear view of the main drive shaft assembly and the secondary bevel gear.

As shown in FIG. 10 and FIG. 11, drive shaft 70 provides the means to both transfer energy from drill 5 and to protect cutting system 10 from potentially damaging over-torque situations from drill 5. Over-torque collar 72 is best shown in FIG. 12. Collar 72 slides onto either shaft 71 or 76 and contains a plurality of collar ridges 72' that form contact angles when collar 72A is joined to collar 72B. As shown in FIG. 10, with acceptable torque applied to drive shaft 70, the resulting linear forces created by contact angles between collars 72A and 72B are not enough to compress spring 74 and cause separation between collars 72A and 72B. However, in the event of an over-torque situation, the linear force caused by the contact angles of collars 72A and 72B cause spring 74 to compress and for collar 72A to slide away from collar 72B. In this over-torque situation, outer shaft 71 is free to spin relative to drive shaft gear 76 with no transfer of energy to the rest of gear assembly 40. With a removal of energy from drill 5, spring 74 causes collars 72A and 72B to reengage. At the end of outer shaft 71 is a drive shaft engagement feature 71' which corresponds to a drill engagement feature 5B. A common hex drill bit shape is shown, but drive shaft engagement feature 71' and drill engagement feature 5B may be any shape that transfers energy from drill 5 to cutting system 10. Preferably, drive shaft engagement feature 71' and drill engagement feature 5B are any common drill drive type including but not limited to, slotted, phillips, Torx or head shape. Drill engagement feature 5B and drive shaft engagement feature 71' provide the means to removably attach drill 5 to cutting system 10, resulting in electronic cutting system 10 being lower cost, lighter weight and more versatile than prior art cutting systems.

Use

Figure 6:
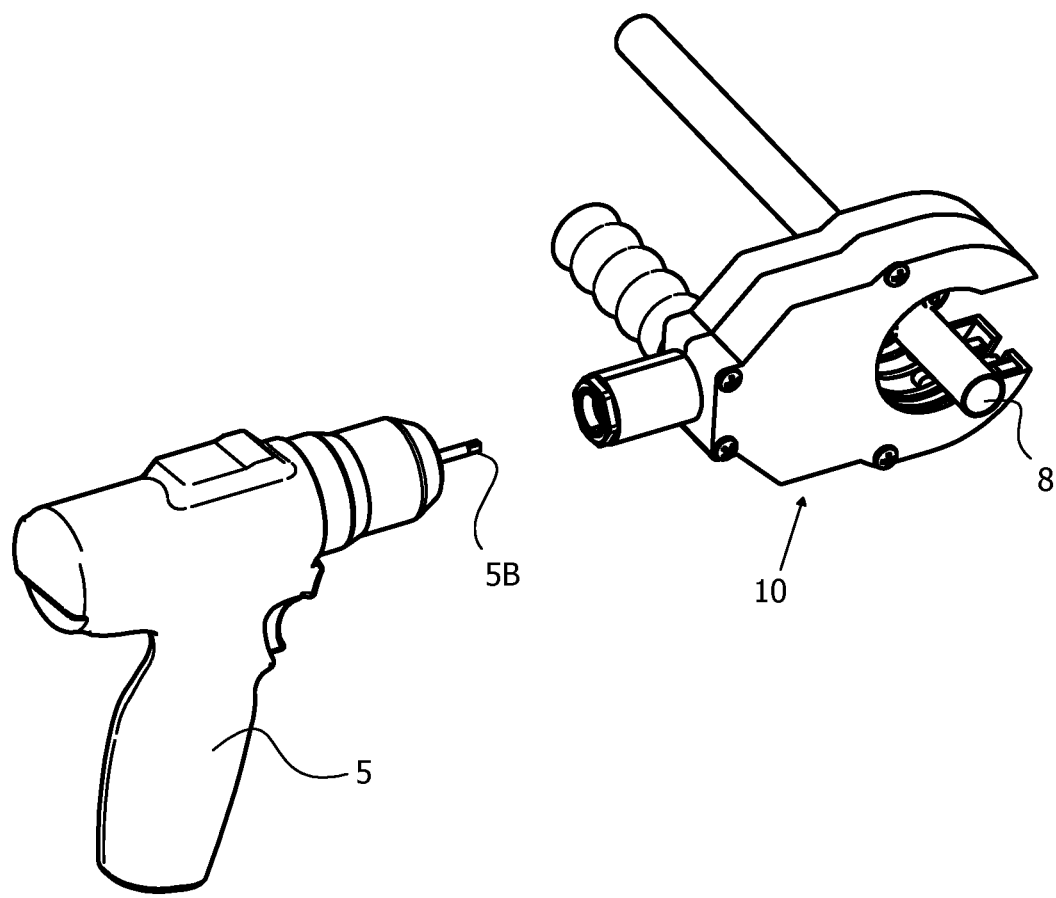
FIG. 6 is a rear perspective view of the pipe cutting system of FIG. 1 having a pipe in the cutting position and a drill prior to engagement to the cutting system.
Figure 7:
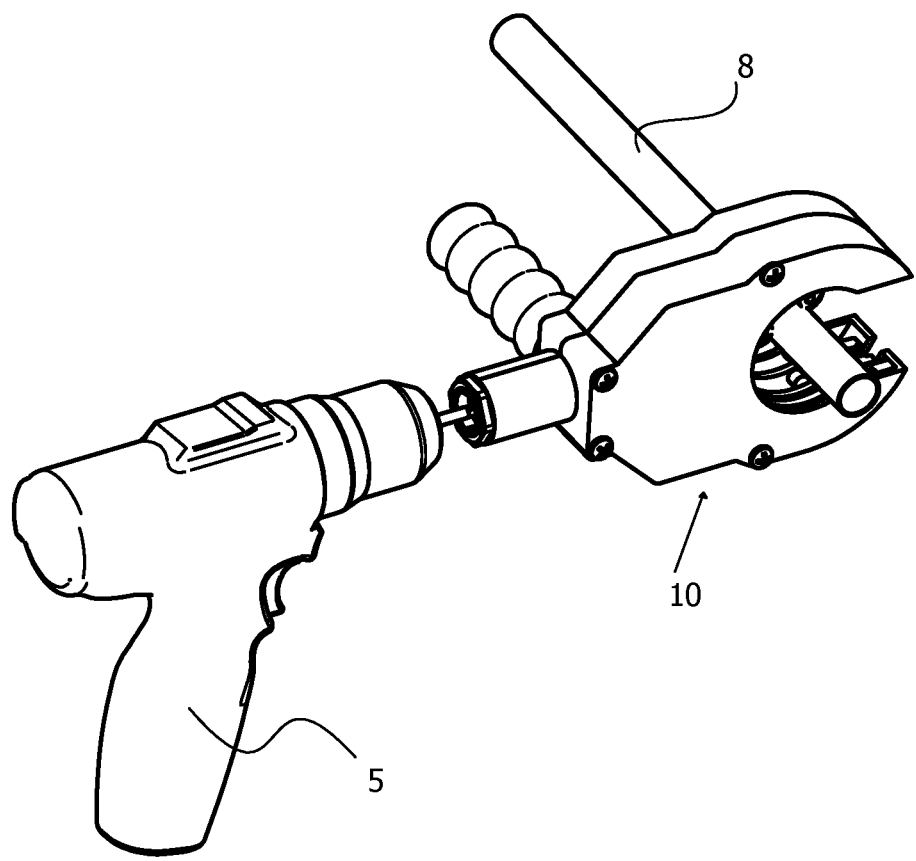
FIG. 7 is a rear perspective view of the pipe cutting system of FIG. 6 but with the drill in the engaged position.
Figure 14:
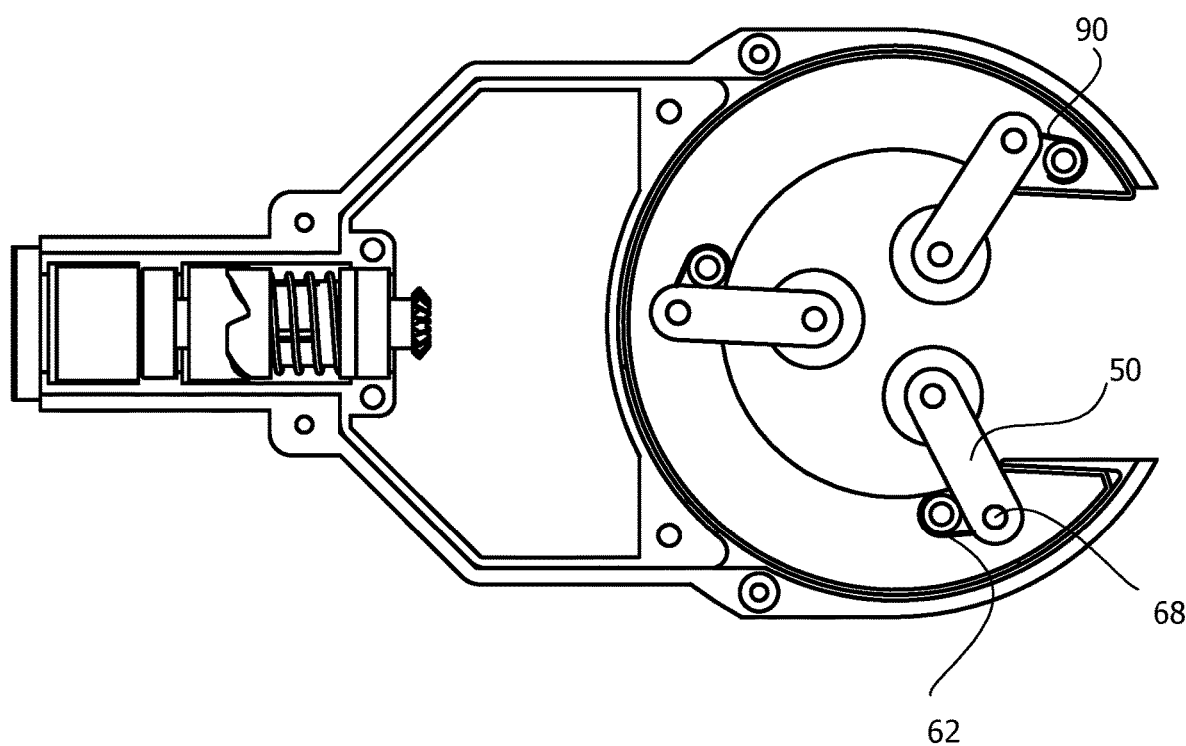
FIG. 14 is a right side view of the pipe cutting system of FIG. 1, and showing the cutting wheel assemblies in the extended position.

The use of cutting system 10 is fairly straight forward. The user, if needed, can rotate driven cutting assembly 60 to ensure that opening 12 exists. The one or more of cutting assembly 50 will be extended as shown in FIG. 14. As shown in FIG. 15, the user pushes pipe 8 in to the loaded position by deflecting one or more of cutting assembly 50. Cutter spring 90 causes cutting assembly 50 to extend and make contact with pipe 8. As shown in FIG. 18, pipe 8 will be in contact with the one or more of cutting assembly 50. As shown in FIG. 6, the user then places drill 5 in the direction of cutting system 10 which is facilitated by the user holding handle 31. Handle 31 may be on the right side, or system 10 can be flipped to allow handle 31 to be on the left side. As shown in FIG. 7, the user engages drill 5 with system 10 by placing drill engagement feature 5B into drive engagement feature 71' of drive shaft 70. By energizing drill 5, torque is applied to drive shaft 70. Gear system 40 transfers and optimizes the torque from drill 5 to driven cutting assembly 60 which contains cutting assembly 50. Driven cutting assembly rotates around pipe 8 causing significant force between cutter wheel 55 and the outside surface of pipe 8. Mechanical deformation of pipe 8 occurs causing pipe 8 to separate into two pieces. After separation, the user removes drill 5 from cutting system 10 and repeats the cutting process when desired.

Although the preceding descriptions set forth the best mode of the present invention, it should not be construed to be limited to the exact descriptions provided. The spirit and scope of the present invention provides novel means for cutting pipe and tube.

I claim:
1. A pipe cutting system comprising:
   a driven cutting assembly having an opening and one or more pivot mounted cutting wheel assemblies;
   said driven cutting assembly having a driven gear ring in mechanical connection with a plurality of spur gears and wherein said spur gears drive a secondary bevel gear;

said secondary bevel gear is in mechanical connection with a drive shaft bevel gear of a drive shaft assembly;

wherein said drive shaft assembly includes a drive shaft engagement feature, and said drive shaft assembly further includes an outer shaft variably connected to said drive shaft bevel gear by a plurality of over-torque collars.

2. The pipe cutting system of claim 1, wherein a cover surrounds said driven cutting assembly and said cover includes a handle.

3. The pipe cutting system of claim 1, wherein said driven cutting assembly includes an anti-rotation ridge.

4. The pipe cutting system of claim 1, wherein said one or more pivot mounted cutting wheel assemblies contain a spring.

5. The pipe cutting system of claim 1, further comprising a drill having a drill engagement feature engaged with said drive shaft engagement feature.

6. The pipe cutting system of claim 1, wherein said drive shaft assembly includes a main drive shaft spring.

7. A pipe cutting system comprising:
a driven cutting assembly having an opening and one or more pivot mounted cutting wheel assemblies having a spring;
said driven cutting assembly having a driven gear ring in mechanical connection with a plurality of spur gears and wherein said spur gears drive a secondary bevel gear;
said secondary bevel gear in mechanical connection with a drive shaft bevel gear of a drive shaft assembly; and,
wherein said drive shaft assembly includes an outer drive shaft having a first over-torque collar in variable mechanical connection with a second over-torque collar.

8. The pipe cutting system of claim 7, wherein said outer drive shaft includes an engagement feature.

9. The pipe cutting system of claim 7, wherein a cover surrounds said driven cutting assembly and said cover includes a handle.

10. The pipe cutting system of claim 7, wherein said driven cutting assembly includes an anti-rotation ridge.

11. The pipe cutting system of claim 7, further comprising a drill having a drill engagement feature engaged with a drive shaft engagement feature of said drive shaft assembly.

12. The pipe cutting system of claim 7, wherein said drive shaft assembly further includes a drive shaft spring.

13. A pipe cutting system comprising:
a driven cutting assembly having an opening and three pivot mounted cutting wheel assemblies biased by a spring;
said driven cutting assembly having a driven gear ring in mechanical connection with a plurality of spur gears and wherein said spur gears drive a secondary bevel gear;
said secondary bevel gear in mechanical connection with a drive shaft bevel gear of a drive shaft assembly; and,
wherein said drive shaft assembly includes an outer drive shaft having a first over-torque collar in variable linear connection with a a second over-torque collar.

14. The pipe cutting system of claim 13, wherein said outer drive shaft includes an engagement feature.

15. The pipe cutting system of claim 13, wherein a cover surrounds said driven cutting assembly and said cover includes a handle.

16. The pipe cutting system of claim 13, wherein said driven cutting assembly includes an anti-rotation ridge.

17. The pipe cutting system of claim 13, further comprising a drill having a drill engagement feature engaged with a drive shaft engagement feature of said drive shaft assembly.

18. The pipe cutting system of claim 13, wherein said drive shaft assembly further includes a drive shaft spring.

19. The pipe cutting system of claim 13, wherein said first over-torque collar and said second over-torque collar include a plurality of collar ridges.

* * * * *